United States Patent [19]
Little et al.

[11] Patent Number: 6,034,807
[45] Date of Patent: Mar. 7, 2000

[54] BISTABLE PAPER WHITE DIRECT VIEW DISPLAY

[75] Inventors: Michael J. Little, Woodland Hills; William P. Robinson, Thousand Oaks; Eric A. Gifford, Newbury Park, all of Calif.

[73] Assignee: MEMSolutions, Inc., Westlake Village, Calif.

[21] Appl. No.: 09/179,750

[22] Filed: Oct. 28, 1998

[51] Int. Cl.[7] .......................... G02B 26/00; G02B 26/08; G09G 3/34

[52] U.S. Cl. .......................... 359/227; 359/230; 359/291; 345/108; 345/109

[58] Field of Search .......................... 345/85, 108, 109; 359/290, 291, 298, 318, 227, 230

[56] References Cited

U.S. PATENT DOCUMENTS

| | | | |
|---|---|---|---|
| 3,553,364 | 1/1971 | Lee | 178/7.3 |
| 3,648,281 | 3/1972 | Dahms et al. | 340/373 |
| 3,846,605 | 11/1974 | Pirchl | 345/108 |
| 3,897,997 | 8/1975 | Kalt | 350/161 |
| 4,160,583 | 7/1979 | Ueda | 350/269 |
| 4,176,345 | 11/1979 | Micheron et al. | 340/373 |
| 4,383,255 | 5/1983 | Grandjean et al. | 345/109 |
| 4,564,836 | 1/1986 | Vuilleumier et al. | 340/783 |
| 4,786,898 | 11/1988 | Hata et al. | 340/783 |
| 4,794,370 | 12/1988 | Simpson et al. | 340/825 |
| 5,062,689 | 11/1991 | Koehler | 359/230 |
| 5,083,857 | 1/1992 | Hornbeck | 359/291 |
| 5,142,405 | 8/1992 | Hornbeck | 359/226 |
| 5,196,767 | 3/1993 | Leard et al. | 315/349 |
| 5,231,559 | 7/1993 | Kalt et al. | 361/301 |
| 5,280,277 | 1/1994 | Hornbeck | 345/108 |
| 5,285,196 | 2/1994 | Gale, Jr. | 345/108 |
| 5,382,961 | 1/1995 | Gale, Jr. | 345/108 |
| 5,389,945 | 2/1995 | Sheridon | 345/85 |
| 5,444,566 | 8/1995 | Gale et al. | 359/291 |
| 5,552,925 | 9/1996 | Worley | 359/230 |
| 5,600,383 | 2/1997 | Hornbeck | 348/771 |
| 5,636,052 | 6/1997 | Arney et al. | 359/291 |
| 5,638,084 | 6/1997 | Kalt | 345/31 |
| 5,677,784 | 10/1997 | Harris | 359/290 |
| 5,754,332 | 5/1998 | Crowley | 359/296 |
| 5,784,189 | 7/1998 | Bozler et al. | 359/254 |
| 5,784,190 | 7/1998 | Worley | 359/291 |
| 5,790,088 | 8/1998 | Johnson et al. | 345/84 |
| 5,835,256 | 11/1998 | Huibers | 359/291 |
| 5,923,313 | 7/1999 | Black et al. | 345/108 |

*Primary Examiner*—Georgia Epps
*Assistant Examiner*—Margaret Burke
*Attorney, Agent, or Firm*—Fleshner & Kim

[57] ABSTRACT

A thin low power, paper white, direct-view display includes an array of bistable micromirrors that are deflected between two stable states, a dark state in which the mirror covers a portion of the background and a white state in which the mirror uncovers the background. The drive electronics are similar to those used in multiplexed LCDs but are modified in order to drive the micromirrors to one of their two stable states. The micromirrors in the enabled row are attracted up or down with sufficient force to exceed the micromirrors' bistable threshold and deflect the micromirrors to their dark and white states, respectively. The attractive forces on the micromirrors in the remaining non-enabled rows are insufficient to exceed the micromirrors' bistable threshold so that the micromirrors remain in their current stable state.

30 Claims, 6 Drawing Sheets

BISTABLE PAPER WHITE DIRECT VIEW DISPLAY

BACKGROUND OF THE INVENTION

1. Field of the Invention

This invention relates to direct view displays and more specifically to a paper white display that combines passive addressing technology with a bistable micromirror faceplate.

2. Description of the Related Art

Direct-view displays produce images that can be viewed directly without the aid of magnification or projection. The market for direct view displays spans a continuum of performance and price that includes the ultra high performance but very expensive flat-panel DTVs, moderately performing and priced laptop computers, and the lower performing but much cheaper personal digital assistants, electronic books and cellular telephones. The high-end displays offer high spatial and color resolution but are very expensive and consume a lot of power. The low-end displays offer less resolution but are relatively cheap and can be operated from battery power.

This low-end market is currently dominated by the multiplexed liquid crystal display (LCD) technology. Multiplexed LCDs sacrifice grey scale performance in favor of fabrication simplicity and power consumption by eliminating the thin film transistor (TFT) array used in Active Matrix LCDs (AMLCD), which dominate the laptop computer market. The liquid crystal panel is fabricated with orthogonal row and column addressing lines on opposite sides of the liquid crystals that are driven by row and column drive electronics. The row drivers enable the row addressing lines one row at a time while the column drivers apply selected voltages to all of the column addressing lines to apply a voltage across the cells in the enabled row. The voltage changes the transmissive characteristics of the liquid crystal, which in turn optically modulates the amount of light transmitted through the LCD.

Because liquid crystals respond relatively slowly to changes in the applied voltage, the cell modulation is proportional to the root-mean-square (rms) voltage applied across the cell throughout the frame time. Although the voltage applied during the row enable is very large, the background noise created by the applied voltages for the remaining n-1 rows greatly reduces the RMS value of the margin between the off-state and full on-state of the liquid crystal. For example, commercially available AMLCDs can resolve about 16 million different colors while similarly available multiplexed LCDs can resolve only 256 different colors. As the number of scanned rows increases, this disparity in grey scale color resolution grows.

These LCDs must be constantly refreshed, e.g. 30 times per second, which consumes a lot of power. Without a sustaining voltage they will decay from their modulated state to their relaxed state over time. Furthermore, the polarizers inherently required by LCDs absorb such a large fraction of the ambient light, typically 60%–70%, they are unable to produce the "paper white" quality desired by the industry. As such consumers must make do with cell phones and PDAs whose gray displays are difficult to read even under the best ambient lighting conditions. Power consuming backlights must be added to improve their readability to minimum acceptable levels.

Another class of displays that are prevalent and gaining market share in low-end applications are bistable displays. True bistable displays have two stable states, black and white, and require no power to remain in either state. Since bistable displays do not require continuous refreshing they are very low power. This makes them ideally suited for applications such as cellular telephones and PDAs. Adequate grey scale resolution can be achieved using standard half-toning techniques. However, known bistable displays suffer from the same problem as multiplexed LCDs, their white state tends to be gray rather than paper white. As a result, they require backlighting and their readability is limited even in the best ambient light conditions.

Kent Displays, Inc. is the leader in bistable Cholesteric LCDs. The bistability of cholesteric optical textures allows for high resolution on a low cost passive matrix with reduced power consumption since power is not needed to continuously refresh the image. The reflected colors of the cholesteric liquid crystal materials provide for a display that is readily viewed in sunlight or low ambient light without dedicated illumination. However, single layer cholesteric LCDs are colored and combining different color layers to get a neutral color dark state severely reduces the overall brightness of the display. These displays are very dim; black characters on a dark grey background instead of black on a white background.

Xerox PARC is developing a gyricon technology in which 100 micron bichromal spheres are cast in a clear elastomer on a flexible substrate. The sphere dipole causes rotation in an electric field to show either the black or white surface of the sphere. The gyricon display is thin, flexible, exhibits a wide viewing angle and, like other bistable devices, requires no power to store the device. However, contrast ratios of only 6:1 have been achieved.

E Ink, Corporation is developing an alternative bistable display technology, electronic ink, in which the ink is made of microcapsules, each of which can change color with an applied electric field. More specifically the microcapsules are filled with a colored dye. Charged white particles are suspended in the dye. Orienting the electric field the right way causes white particles to be attracted to the surface so that the display appears white and vice-versa. E Ink claims to have achieved 75% brightness, 30:1 contrast ratio and a 180 degree viewing angle.

Iridigm Display Corporation uses a MEMS technology in which bridge-like elements move up and down in response to an applied voltage to achieve a bistable display. By changing an element's position from up to down, either constructive or destructive interference is created with an external light source. This allows each element to switch from reflective to absorbing, from green to black, for example. Each image pixel is composed of tens-to-hundred of bridge elements, which facilitates grey scale and reduces yield requirements. Iridigm's displays are fabricated on glass substrates using standard thin film transistor (TFT) materials and processing techniques, that allow them to construct aluminum bridge elements and a proprietary thin-film stack to control interference. However, because Iridigm's display is based on interference patterns it will be sensitive to viewing angle and will have difficulties achieving paper white quality.

A number of electromechanical shutter bistable display technologies have been pursued and patented for direct view displays, but have not yet succeeded to large scale commercialization due to a variety of issues including fabrication, stiction, limited contrast ratio, poor optical efficiency, high cost and poor pixel uniformity. These displays are bistable in the sense that they are black and white and do not require continuous refresh. However, they do require power to store the image and thus are not bistable in the truest sense of the meaning.

U.S. Pat. No. 3,553,364 to Lee entitled "Electromechanical Light Valve" describes an electromechanical light valve in an array of many such valves for controlling the transmission of light in continuously changing patterns. Each light valve consists of a housing having grounded conducting walls for shielding the interior thereof from external electrostatic forces produced by surrounding valves and a leaf shutter mounted in the housing. The application of a voltage to the leaf shutters causes the shutter to be attracted to the grounded conducting walls. As the voltage differential increases, the angle the shutter deflects increases, which in turn allows less light to pass through the housing.

Lee's design always involves the leaf shutters touching one surface or another, e.g. the conductive center plate or the grounded conductive walls, which can and will cause stiction due to the Van der Waals forces. The optical efficiency of this design is very low due to the low open aperture caused by the opaque conductive sidewalls. The portion of each pixel that is transparent and thus able to transmit light is a small fraction of the pixel. In addition, the cost and complexity of fabricating an array of such housings makes high resolution displays impractical.

U.S. Pat. No. 4,564,836 to Vuilleumier et al. entitled "Miniature Shutter Type Display Device with Multiplexing Capability" describes a display device comprising an insulating carrier and shutters that are capable of rotating under the effect of an electric field. The shutters are grouped in pairs and are controlled by applying a voltage between the shutter and a counter-electrode. After actuating the selected shutter, a holding voltage is then applied between the pair of shutters to hold them in place. Vuilleumier's device involves shutters touching each other or a stop, which can cause stiction problems. This design, like that of Lee, also has low optical efficiency due to the opaque sidewalls of the individual cavities.

U.S. Pat. 5,784,189 to Bozler et al. entitled "Spatial Light Modulator" discloses a spatial light modulator formed of a moveable electrode which is disposed opposite a fixed electrode, and is biased to roll in a preferred direction upon application of an electric field across the electrodes to produce a light valve or light shutter. As shown in FIGS. 24–25, Bozler teaches a quasi "bistable" device, one in which the "hold-on" voltage is less than the voltage required to initially turn the shutter on. Bozler's devices do not exhibit true bistability in the sense that if the field is removed entirely the device does not remain in one of two stable positions. Energy is required to resist the spring force. This consumes power equal to the product of the hold-on voltage and the parasitic resistance.

Bozler's quasi "bistability" is created by forming a step S in the moveable electrode, which produces a hysteresis in the voltage required to unroll the coil. A second way to create a quasi bistable device is to use the Van der Walls forces, which occur when two materials come into contact. By selecting materials and controlling the surface condition a magnitude of adhesion force can be achieved which is low enough to allow roll-up of the shutter at zero applied voltage but large enough to significantly reduce the hold voltage below the roll out voltage, assuming there is no step. An alternate bistable device is illustrated in FIG. 27, in which a deformable membrane switch switches between an up position where it looks white or the color of the conductor and a flat position where it looks black or blue. The deformable switch is biased in the up position by anisotropic stress. Once pulled down by the application of an electric field, the switch will stay down due to the Van der Waals forces as long as the applied electric field exceeds a threshold. In all cases, Bozler's designs cannot achieve true bistability since none of his designs teach a method of actively driving the shutter into both the "ON" state and the "OFF" state.

SUMMARY OF THE INVENTION

In view of the above problems, the present invention provides a thin, low power, paper white direct-view display.

The display includes (1) an array of electrostatically actuated bistable micromirror structures that are mounted in front of a contrasting background, are electrically connected by a plurality of column addressing lines, and deflect between two stable states; (2) a first plurality of row addressing lines that are positioned above the micromirror; and (3) a second plurality of row addressing lines that are positioned below the micromirror structures.

The two stable states of each micromirror structure are preferably an open state, in which the micromirror structure covers a portion of the contrasting background, and a closed state, in which the micromirror structure uncovers the portion of the contrasting background. In operation, the micromirror structures respond to potential differences between the micromirror structures and the row addressing lines that produce attractive forces that actuate the micromirror structures a row-at-a-time between the two stable states. The row addressing lines may be configured to connect arrays of attractor pads that are positioned above and below the micromirrors. The attractor pads provide a larger area than the addressing lines, which increases the attractive force for a given voltage.

Because the micromirrors are bistable and respond very quickly, a passive addressing scheme, i.e. no transistor array, can be used to deflect the micromirrors between their two states. Row drive electronics enable one pair of row addressing lines at a time while column drive electronics simultaneously drive all the column addressing lines so that the micromirrors in the enabled row are attracted either up or down with sufficient force to exceed the micromirrors' bistable threshold and deflect each micromirror to its intended stable state. The attractive forces on the micromirrors in the remaining non-enabled rows are insufficient to exceed the micromirrors' bistable threshold so that the micromirrors remain in their current stable state. The bistable micromirrors do not require continuous refreshing or even a quiescent power to hold them in their desired state and thus operate at very low power levels.

In a preferred embodiment of the invention, the micromirrors are formed on a translucent white substrate and positioned in front of a backlight. Under most ambient lighting situations, the display achieves near paper white quality. When ambient light is absent, the backlight provides sufficient illumination to achieve near paper white quality. Each mirror petal has a highly reflective surface and a highly absorbent surfaces. This configuration produces a dark state in which the mirror's outwardly facing absorbent surface covers a portion of the white background to both block transmitted light and absorb ambient light and a white state in which the mirror uncovers the background to reflect ambient light onto the white substrate and let transmitted light pass. Alternately, the display can be implemented without a backlight, in which case the background could be black (opaque white) and the mirrors could reflect (absorb) ambient light when covering the background. In either case, adequate grey scale resolution can be achieved using conventional half-toning techniques. A color display can be implemented with a red, green and blue striped substrate.

True bistable response of the micromirror structures can be achieved in different ways. In a first preferred embodiment of the present invention, bistability is provided using the mechanics of the micromirror hinge, by making one edge of the hinge longer than the other. This produces a compressive force when the hinge is flat that tends to drive the hinge to one of the two stable states. The hinge will remain in its stable state unless a sufficient force is applied to overcome the compressive force.

In a second preferred embodiment of the present invention, the bistable response is provided using Van der Waals forces. This is achieved by actuating the micromirror between a pair of stops. The material used for the stops and the stop surface can be tailored to achieve an adhesion force with a magnitude that is low enough to allow the micromirror to be driven to the opposite state when its row is enabled, but large enough to exceed any force that may be acting on the micromirror when its row is not enabled.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a paper-white bistable direct-view display in which a passive addressing scheme deflects an array of electrostatically-actuated micromirrors between two stable states, an open state in which the mirror covers a portion of a contrasting background and a closed state in which the mirror uncovers the background, to produce a visible image. The portion covered by the mirror corresponds to an image pixel or some fraction of an image pixel. Grey scale is achieved using standard half-toning techniques in which each image pixel corresponds to multiple mirrors. The flat-panel display exhibits paper white quality at a fraction of the power required by multiplexed LCDs.

The bistable micromirror display provides a particularly good fit with certain user-interactive applications such as personal digital assistants, cellular telephones and electronic books that require a good white state and low power consumption but only limited grey scale resolution. The micromirror display provides the brightness required to achieve the elusive "paper white" quality that the display industry has been seeking and that consumers have been demanding. Furthermore, the micromirror display does not require continuous refreshing or even a quiescent power to hold the current image, and thus only consumes power when the image content changes. Because the content of these types of displays changes relatively infrequently, the amount of power needed to drive the display may be an order of magnitude or less of that required to drive an LCD. In addition, because the display is paper white in ambient light, the backlight is required much less frequently, only as a night light. Since the display and backlight may consume a substantial portion of the total power used by these devices, this dramatic improvement will extend battery life and may eliminate the need for a rechargeable battery altogether and allow such devices to run off photo electric cells.

Figure 1:
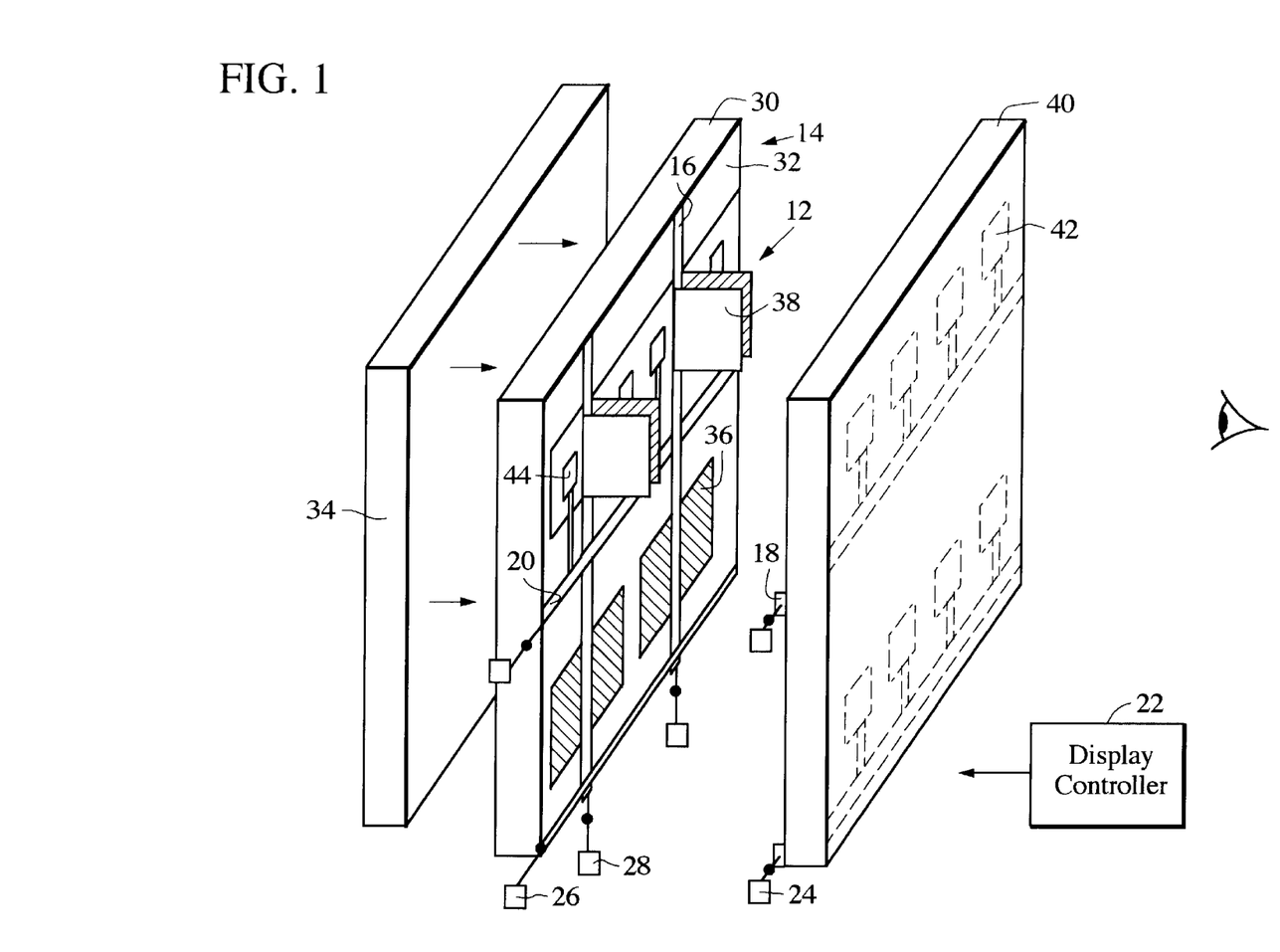
FIG. 1 is a perspective view of a bistable direct-view display in accordance with the present invention.

As shown in FIG. 1, a direct-view display 10 includes an array of electrostatically-actuated bistable micromirrors 12 that are placed in front of a white background 14. Each micromirror 12 switches between two stable states, a dark state in which the mirror covers a portion of background 14 and absorbs incident light and a closed state in which the mirror uncovers the background and reflects ambient light onto the background. To maximize contrast ratio, the mirror preferably deflects a full 90 degrees to uncover the entire portion covered by the mirror. However, near paper white quality can be achieved with something less than full 90 degree deflection. Limited grey scale can be achieved using conventional half-toning techniques.

Micromirrors 12 are bistable, and thus require no power to remain in either state. Since bistable displays do not require continuous refreshing or even a quiescent power to hold them in their current state they require very low power. Bistability may be achieved in many different ways. A micromirror hinge having one edge longer than the other produces a compressive force when the hinge is flat that tends to drive the hinge to one of two stable states. Another approach is to deflect a freely rotating micromirror between a pair of stops and use the Van der Waals forces to produce the bistability. These approaches may be used in combination to improve reliability.

The drive electronics are similar to those used in multiplexed LCDs but are modified in order to drive the micromirrors between their two stable states. The micromirror array is connected into a number of columns by column addressing lines 16. Two sets of row addressing lines, 18 and 20, are respectively positioned above and below the micromirror array.

A display controller 22 causes the row drive electronics, 24 and 26, to enable one pair of row addressing lines, 18 and 20, at a time. The column drive electronics 28 simultaneously drive column addressing lines 16 so that the micromirrors in the enabled row are attracted either up or down with sufficient force to exceed the micromirrors' bistable threshold and deflect the micromirrors to their dark and white states, respectively. Because the micromirrors exhibit very fast response times they can be driven to the desired stable state within the row-addressing period. The attractive forces on the micromirrors in the remaining non-enabled rows are insufficient to exceed the micromirrors' bistable threshold so that the micromirrors remain in their current stable state. The display can be updated with or without an erase state.

In the specific embodiment illustrated in FIG. 1, the array of micromirrors 12 are supported on a glass substrate 30. In this particular configuration, the substrate has a translucent white surface 32 that both reflects ambient light and transmits light from a backlight 34 to provide the white background 14. The micromirrors have a highly absorbent interior surface 36 such that in their dark state the micromirrors block any transmitted light and absorb any ambient light. In their white state, the micromirrors allow transmitted light to pass through and ambient light to be reflected off of the background. The mirrors' exterior surfaces 38 are preferably highly reflective to maximize the amount of light reflected in the white state. Unlike LCDs and other bistable displays, the backlight is not required under normal ambient lighting conditions. Given the display's paper white quality, the backlight is only needed as a night light.

If the display is designed for ambient light viewing only, i.e. no back light, the background could be black (opaque white) and the mirrors could reflect (absorb) ambient light when covering the background. Color displays can be realized by coloring the background red, green and blue and using black mirrors or by applying varying thickness dielectric films such as SiO2 or Si3N4 to the mirrors to allow them to reflect specific colors, i.e. the oil film on water effect.

Row addressing lines 18 and 20 are respectively formed on the backside of display faceplate 40 and on the surface of substrate 30. The row addressing lines can be configured to both route the addressing voltages and provide the reference for attracting the micromirrors. As shown, row addressing lines 18 and 20 are configured to connect attractor pad array 42 that lies above the micromirrors on faceplate 40 and attractor pad array 44 that lies below the micromirrors on substrate 30 into rows that correspond to rows of micromirrors. The attractor pads have a larger cross-sectional area than the addressing lines, which increases the attractive force for a given voltage. Lower voltage drive electronics are easier to fabricate and are cheaper. Column addressing lines 16 are also formed on the surface of substrate 30. Air bridges or crossovers are used to electrically isolate the row and column addressing lines. Alternately, either the row or column addressing lines could be formed in a buried layer beneath the micromirror array.

Although there are potentially many different schemes that can be used to control the row and column drivers to actuate the micromirrors, there are some common relationships that should be satisfied and some design characteristics that are preferred. First, during a row enable the row and column drivers must apply voltages such that the net attractive force on micromirror 12, either up or down, is greater than the mirror's bistable threshold so that the mirror will be driven to the selected stable state. Second, the voltages on the remaining n−1 rows must produce a net attractive force on micromirror 12, either up or down, that is less than the mirror's bistable threshold so that the mirror will remain in its current stable state. Third, the addressing scheme should be designed to simplify the hardware and conserve charge. Fourth, the addressing scheme is preferably designed to avoid the necessity of an erase state. The inclusion of an erase state will accomplish the same purpose but complicates the design and operation of the display. Lastly, once all of the pixels in the display have been set to their desired state power to the mirrors can be removed. This will eliminate any quiescent power loss.

Figure 2:
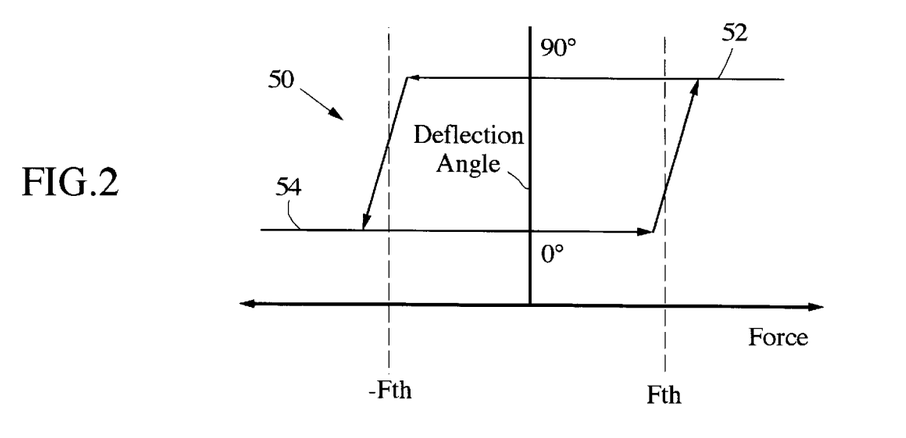
FIG. 2 is a plot of the bistable response exhibited by the micromirror.

The bistable response 50 exhibited by the micromirror is depicted in FIG. 2 in terms of the net force exerted on the mirror. When the net attractive force on the mirror is toward the row addressing line and/or attractor pad above the mirror and exceeds a threshold (Fth), the mirror deflects to its up position 52. The mirror remains in its up position until the net attractive force is toward the row addressing line and/or attractor pad below the mirror and exceeds -Fth. This causes the mirror to deflect to its down position 54 where it again remains until the net force in the opposite direction exceeds the threshold. It is clear that the micromirror is truly bistable. Once switched to a stable state, the mirror will remain in the stable state if power is removed.

The bistable response assumes that the actuating force is applied for a long enough period of time that the mirror switches to the stable state. If the actuating force were to be removed while the mirror was in an unstable state, the mirror may deflect to the desired stable state or return to the previous stable state. This is precisely why the fast response time of the micromirrors is so important. The row addressing time can be relatively short, on the order of hundreds of microseconds, and still assure stable switching. Because the row addressing time is short, the number of rows that can be addressed is high, much higher than multiplexed LCDs.

FIGS. 3a–3d and 4 illustrate a complete write sequence that utilizes simple drivers to switch the voltages on the row and column addressing lines and does not entail an erase sequence. In this particular example, row addressing lines 18 are switched between 0V and −V, row addressing lines 20 are switched between 0V and +V, and column addressing lines 16 are switched between −V and +V. Clearly different voltage combinations will work as long as they produce net attractive forces that satisfy the mirror's bistable response. Once the display has been updated, the power can be turned off, i.e. all voltages switched to zero, until the display changes again.

Also in this particular example, the attractor pads 42 above the micromirrors are shown in two different configurations, a pair of pads 42a that are centered above each mirror in its open state and a single pad 42b that is centered between the two mirrors in their closed state. The single pad configuration should reduce crosstalk between adjacent mirror pairs. In general, the attractor pads should be configured such that the normal component of the force produced by the electric field between the attractor pad and mirror is maximized in order to reduce the voltage swing required to actuate the mirrors. This is a practical consideration that goes to the ability to fabricate the display on low voltage fabrication lines and reduce cost.

Figure 3A:
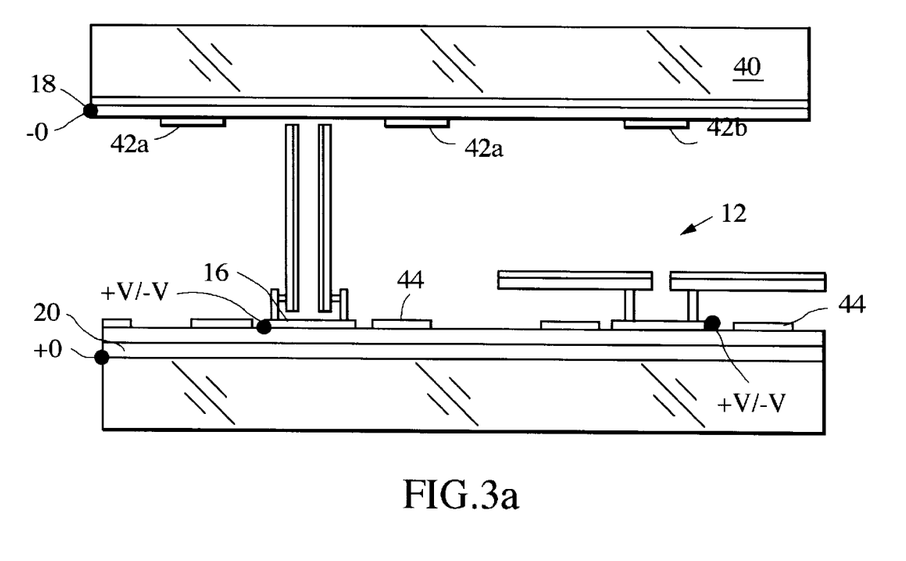
FIGS. 3a through 3d are sectional views of the display during an addressing sequence.

As shown in FIG. 3a, the row of two micromirrors 12 are not enabled. The voltage on the attractor pads above and below the micromirrors is 0V so that the net force on the micromirrors, whether they are driven with −V or +V, is less than the threshold force. In either case, the mirror will be attracted to both pads such that the attractive forces will tend to cancel each other. Due to the device geometry the cancellation will not be exact but sufficient to reduce the net force in either direction below the threshold.

Figure 3B:
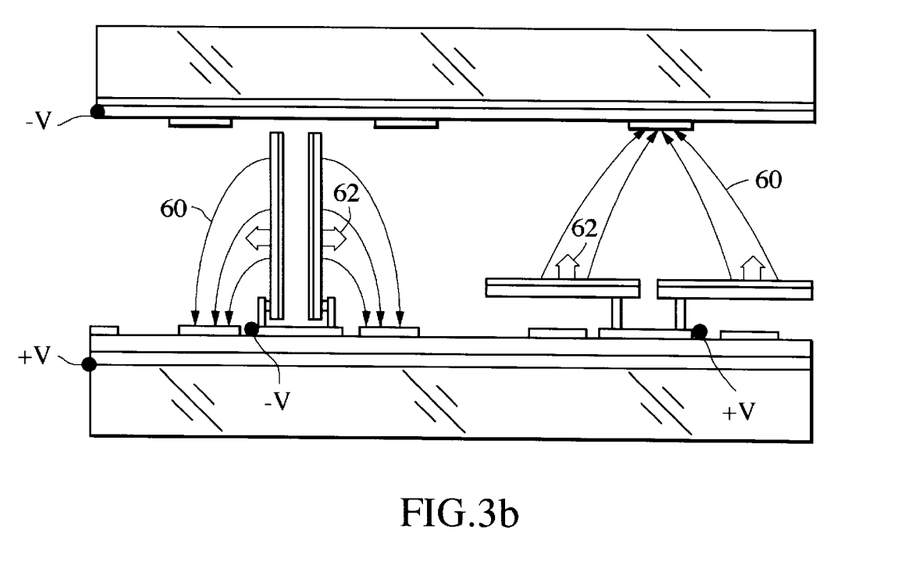

As shown in FIG. 3b, the write sequence is initiated for the jth row by switching the voltage applied to row addressing lines 18 and 20 to −V and +V, respectively, and switching the voltage on the column addressing lines 16 to the desired state, either −V or +V while the row addressing lines for the j−1 and j+1 rows go to 0 V. As described in FIG. 3a, the mirrors in rows j−1 and j+1 will remain in their stable states. In the jth row, the application of −V to the micromirror creates zero potential difference between the mirror and attractor pad 42a above the mirror and creates a 2V potential difference between the mirror and attractor pad 44 below the mirror so that the only force acting on the mirror is an attractive force toward pad 44. The value 2V is selected such that the force exceeds the threshold force needed to switch states. To this end, attractor pads 42 and 44 are preferably configured so that the electric field 60 between the pad and the mirror produces a force component 62 that is normal to the mirror that causes the mirror to pivot and deflect to the desired stable state. Similarly, the application of +V to the other mirror produces an attractive force toward pad 42b that exceeds the threshold force needed to switch states.

Figure 3C:
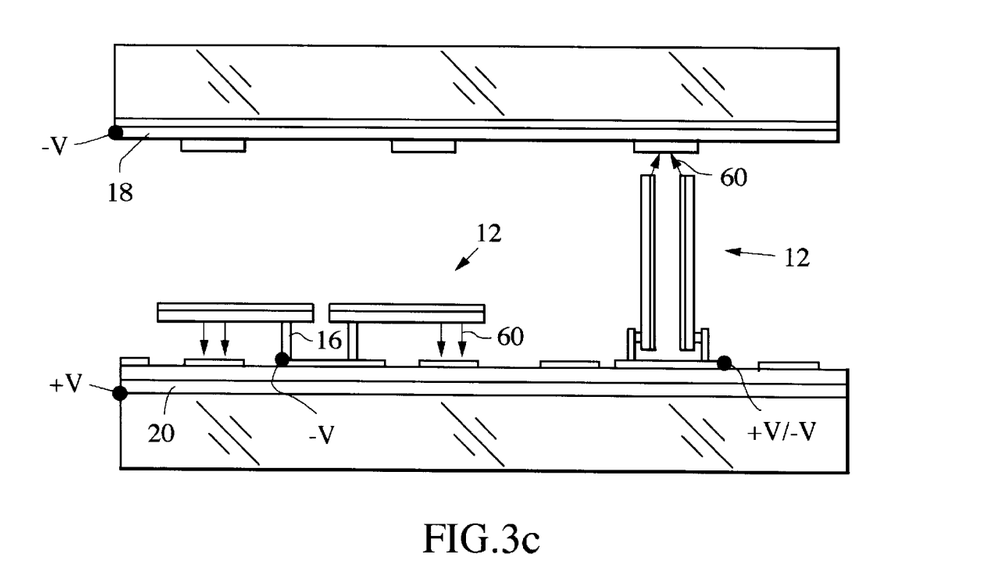
Figure 3D:
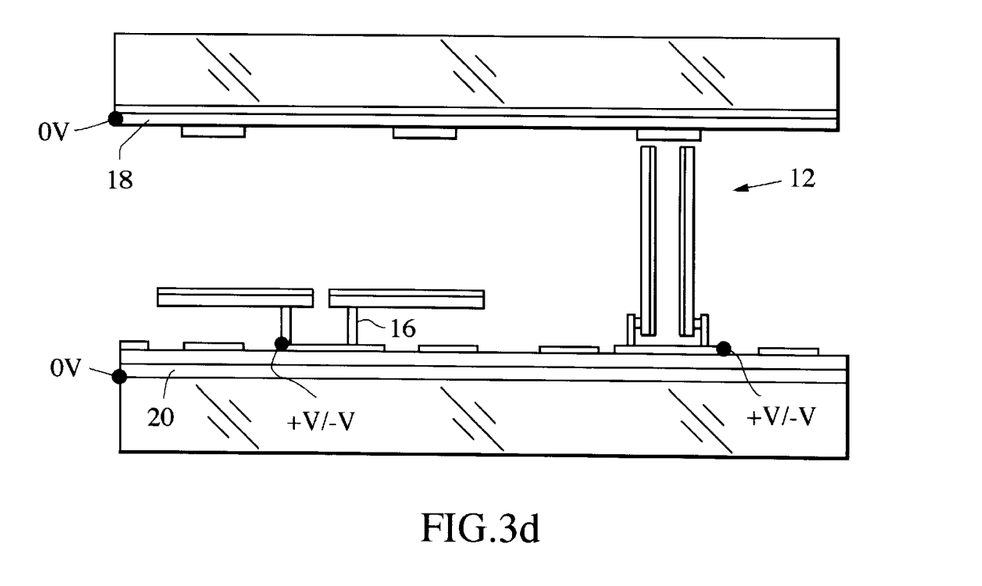
Figure 4:
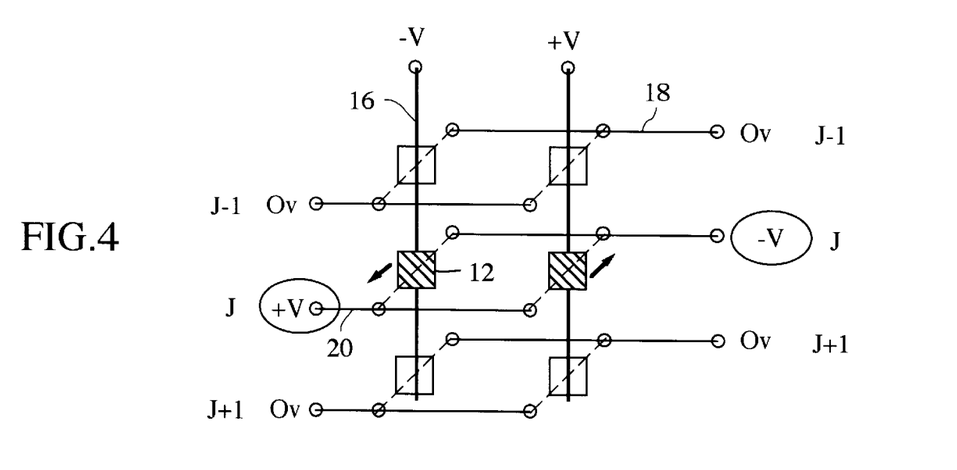
FIG. 4 is a schematic illustration of the passive addressing scheme.
Figures 5A, 5B:
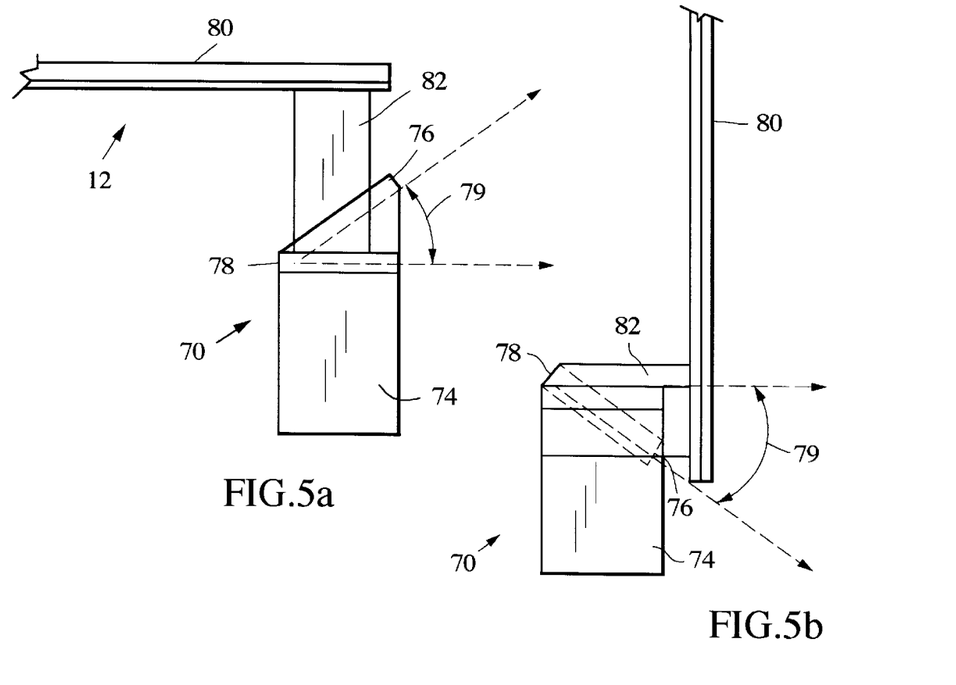
FIGS. 5a and 5b are sectional views of a micromirror that uses a bistable hinge.
Figures 6A, 6B:
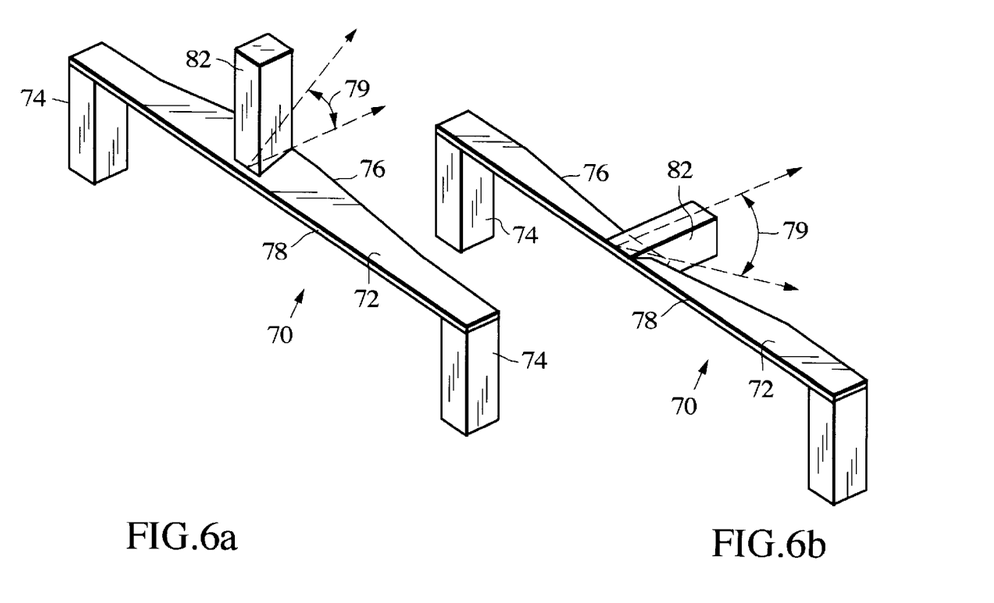
FIGS. 6a and 6b are perspective views of the bistable hinge shown in FIG. 5 in its two stable states.

As shown in FIG. 3c, micromirrors 12 have switched states while the row is still enabled, i.e. the mirror response time is less than the row-addressing period. As discussed previously, if this were not true the mirrors could be in an unstable state when the row was disabled and either return to their previous stable state or switch to the desired stable state. As shown in FIG. 3d, the row addressing lines have been disabled. Regardless of what voltages (+V/−V) are applied to the column addressing lines for the next n−1 rows the net forces on the micromirrors are constrained to lie below the threshold and the mirrors will remain in their current stable state.

Figure 7A:
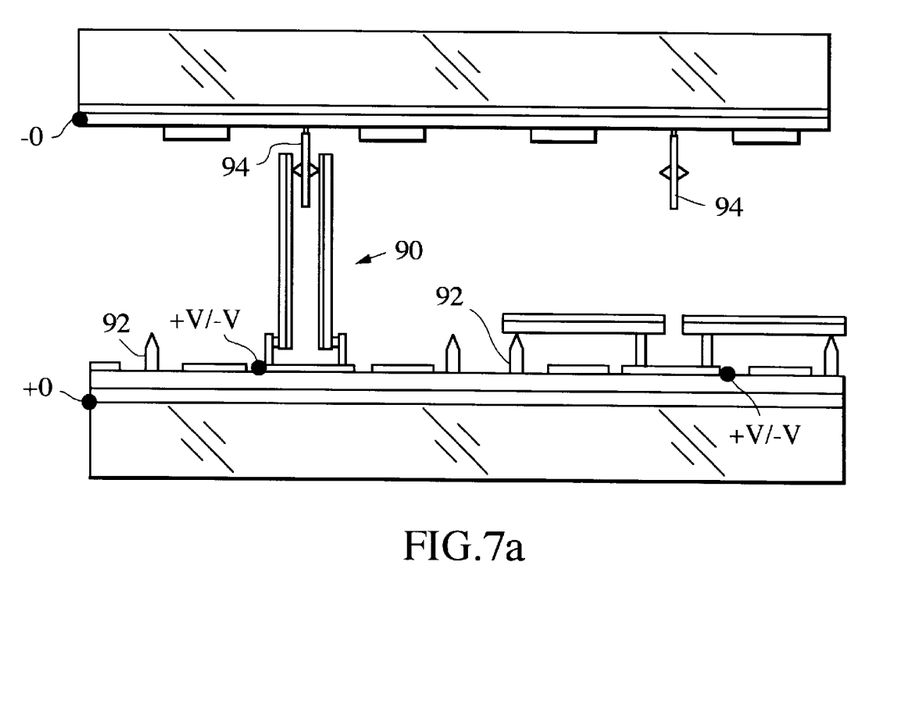
FIGS. 7a and 7b are sectional views of an alternate display in which Van der Waals forces are used to provide the desired bistable response.
Figure 7B:
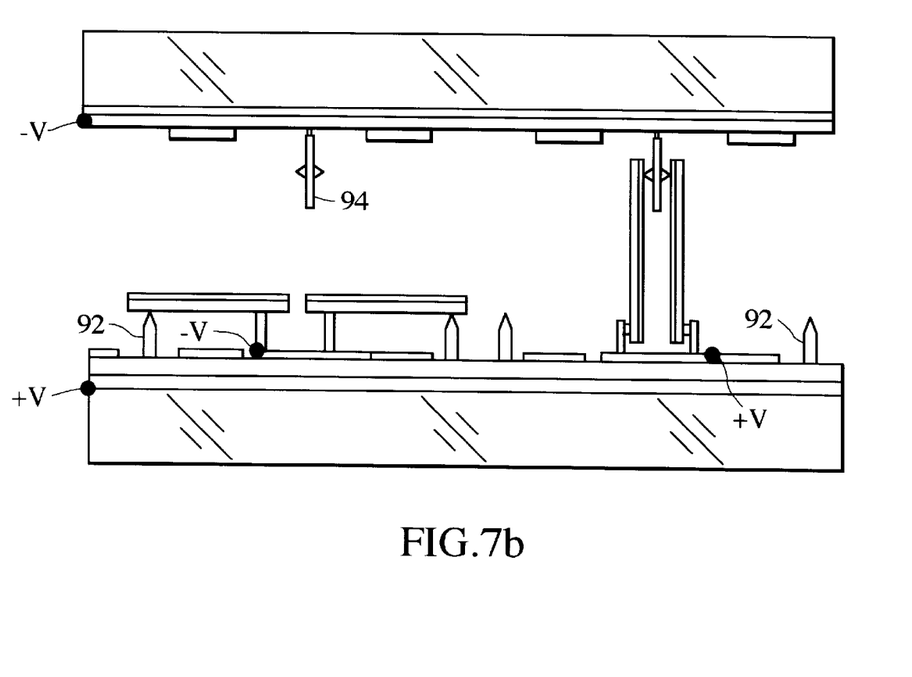

The micromirrors are truly bistable, and thus require no power to remain in either state. Since bistable displays do not require continuous refreshing or even a quiescent power to hold them in their current state they are very low power. Bistability may be achieved by making one edge of the micromirror hinge longer than the other as shown in FIGS. 5a–b and 6a–b. This produces a compressive force when the hinge is flat that tends to drive the hinge to one of two stable states. Another approach is to deflect a micromirror between a pair of stops and use the Van der Waals forces to produce the bistability as shown in FIGS. 7a–b. These approaches may be used in combination to improve reliability.

As shown in FIGS. 5a–5b and 6a–6b, one approach to achieving a true bistable response is to mount micromirror 12 on a hinge 70 that has only two stable states approximately 90° apart. One such hinge 70 comprises a relatively long narrow compliant strip 72 that is pinned at both ends by posts 74, which are mounted on the substrate (not shown). As shown the strip's outside edge 76, i.e. the edge opposite micromirror 12, is longer than the inside edge 78. This can be accomplished in a number of ways including fabricating the strip over a polyamide bump so that the outside edge is naturally longer. Alternately, an even narrower strip of material under compressive stress can be defined along the outside edge of the otherwise flat strip. The strip's compressive stress causes the outside edge to stretch to the desired length. Similarly, the compliant strip can be formed with compressive stress and an even narrow strip of material under tensile stress can be defined along the inner edge to shorten it.

As a result, strip 72 has a maximum compressive stress when it is flat and naturally "pops" or "snaps" to a stable cupped position either above or below the flat position. The amount of cupping, i.e. the deflection angle 79 formed between the flat and cupped positions at the midpoint of strip 72, is proportional to the difference in length between in the inside and outside edges. This difference is set so that the deflection angle 79 at the midpoint of strip 72 in either direction is approximately 45°.

Micromirror 12, which is covered with an anti-reflective coating 80, is mounted on a post 82 at the midpoint of strip 52. The bottom of post 62 is tapered by a complementary 45° such that the mirror lies approximately flat in one position and approximately upright in the other. Alternately, the lengths of the inside and outside edges and the direction of post 82 can be reversed with the same result.

As shown in FIGS. 7a–7b, another approach to achieving a bistable response is to actuate a mirror 90 between a pair of stops 92 and 94 and use the Van der Walls forces, which occur when two materials come into contact, to create the bistability. By selecting materials and controlling the surface condition a magnitude of adhesion force can be achieved which is low enough to allow the mirror to be driven to the opposite state when its row is enabled but large enough to exceed any force that might be applied to the mirror when its row is not enabled. As shown, stops 92 and 94 form a tip at the point of contact with mirror 90. The radius and/or area of the tip determines the magnitude of the adhesion force so that the mirror can be driven to the opposite state without having to use high voltage drive electronics.

This configuration can be implemented in combination with the bistable hinge structure discussed above to increase reliability should either fail. In this case, the display would be configured so that either force is sufficient to hold the mirror in its current state when the row is not enabled. When the row is enabled, the actuating force would exceed the sum of the two forces. Alternately, a very weak or even a freely rotating hinge structure can be used in conjunction with the Van der Waals forces. The latter type of structure can be built using standard MEMS processing techniques such that the mirror is formed with a pair of pins that are positioned inside a pair of yokes.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A bistable direct-view display, comprising:
   a background;
   an array of electrostatically-actuated bistable micromirrors that switch between two stable states, an open state in which the mirror covers a portion of said background and a closed state in which the mirror uncovers the background;
   a plurality of column addressing lines that connect said array of micromirrors into respective columns;
   a first plurality of row addressing lines that lie above respective rows of the micromirrors; and
   a second plurality of row addressing lines that lie below respective rows of the micromirrors,
   said micromirrors responding to potential differences between said micromirror and said first or second row addressing lines that produce electrostatic attractive forces to actuate the micromirrors between their two stable states a row at a time.

2. The direct-view display of claim 1, further comprising an array of hinges that actuate said respective micromirrors between their open and closed states, said hinges having a bistable response that actuates the micromirrors between their two stable states.

3. The direct-view display of claim 2, wherein said hinges exhibit a compressive stress when flat such that the hinge wants to rotate up or down to a stable state to relieve the compressive stress, said hinge rotating between its stable states in response to the attractive electrostatic forces to actuate the micromirrors between their two stable states.

4. The direct-view display of claim 3, wherein said hinges have a pair of edges of unequal length, the longer edge exhibiting the compressive stress when flat such the longer edge wants to snap up or down to relieve the compressive stress thereby causing the hinge to rotate to one of its two stable states in response to the attractive electrostatic force.

5. The direct-view display of claim 4, wherein said array of micromirrors is mounted on a substrate, each said hinge comprising:
   a pair of posts on said substrate;
   a compliant strip having the pair of edges of unequal length that are pinned at both ends by said posts above said substrate, said compliant strip's longer edge snapping up and down at its midpoint to relieve the compressive stress and rotate the strip about its shorter edge between the hinge's stable states; and a support post at the midpoint of said compliant strip that supports said micromirror and translates the rotation of the compliant strip such that the micromirror actuates between its open and closed states.

6. The direct-view display of claim 5, wherein said compliant strip rotates approximately plus and minus 45° with respect to the substrate, said support post being tapered by approximately 45° to translate this rotation such that the micromirror actuates between approximately 0° in its open state and 90° in its closed state.

7. The direct-view display of claim 1, further comprising first and second stops that contact said micromirror in its open and closed states respectively, the Van der Walls forces that occur when the micromirror contacts said stops creating the micromirrors' bistable response.

8. The direct-view display of claim 7, wherein said first and second stops form a tip at the point of contact with micromirror.

9. The direct-view display of claim 1, further comprising first and second arrays of attractor pads that respectively lie above and below the array of micromirrors and are electrically connected into rows by said first and second plurality of row addressing lines.

10. The direct-view display of claim 9, wherein the second array of attractor pads lie directly beneath the respective micromirrors in their open state.

11. The direct-view display of claim 10, wherein the array of top attractor pads lie directly above the respective micromirrors in their open state.

12. The direct-view display of claim 10, wherein the array of top attractor pads includes one said top attractor pad for multiple said micromirrors that is approximately centered above the micromirrors in their closed state.

13. The direct-view display of claim 1, wherein said micromirrors switch with a known response time, further comprising:

first and second pluralities of row drivers that switch the voltages on the row addressing lines to enable the micromirrors one row at a time for a period longer than the micromirrors response time; and a plurality of column drivers that switch the voltages on the column addressing lines to actuate the micromirrors between their open and closed states.

14. The direct-view display of claim 13, wherein said first and second pluralities of drivers switch the voltages on the row addressing lines between 0V and +V, and 0V and −V, respectively to disable and enable the micromirrors and said plurality of two-state column drivers switch the voltages on the column addressing lines between +V and −V to actuate the micromirrors between their open and closed states.

15. The direct-view display of claim 13, further comprising a display controller that, in response to a change in content of the image, directs the row and column drivers to update the image and then turns the power to the display off until the content changes again.

16. A bistable direct-view display, comprising:

a background;

an array of electrostatically-actuated bistable micromirrors that deflect in a known response time between two stable states, an open state in which the mirror covers a portion of said background and a closed state in which the mirror uncovers the background, to produce a direct-view image;

a plurality of column addressing lines that electrically connect the respective columns of micromirrors;

first and second pluralities of row addressing lines that lie above and below the array of micromirrors, respectively; and a display controller that applies a voltage to one pair of said first and second row addressing lines to enable the micromirrors one row at a time for a period longer than the mirrors' known response time and drives the column addressing lines between binary voltages to produce attractive electrostatic forces on micromirrors in the enabled row that exceed the mirrors' bistable threshold and actuate the mirrors between their two stable states to cover and uncover the background, the attractive electrostatic forces on the micromirrors in the remaining non-enabled rows being insufficient to overcome the mirrors' bistable threshold so that the mirrors remain in their stable state.

17. The direct-view display of claim 16, further comprising an array of hinges that each have a pair of edges of unequal length, the longer edge exhibiting a compressive stress when flat such the longer edge wants to snap up or down to relieve the compressive stress thereby causing the hinge to rotate to one of two stable states in response to the attractive electrostatic force and thereby actuate the micromirror to its open or closed state.

18. The direct-view display of claim 16, further comprising first and second stops that contact said micromirror in its open and closed states respectively, the Van der Walls forces that occur when the micromirror contacts said stops creating the micromirrors' bistable response.

19. The direct-view display of claim 18, wherein said first and second stops form a tip at the point of contact with micromirror.

20. The direct-view display of claim 16, further comprising first and second arrays of attractor pads that respectively lie above and below the array of micromirrors and are electrically connected into rows by said first and second plurality of row addressing lines.

21. A bistable direct-view display, comprising:

a background;

an array of electrostatically-actuated bistable micromirrors that deflect in a known response time between two stable states, an open state in which the mirror covers a portion of said background and a closed state in which the mirror uncovers the background, to produce a direct-view image;

a plurality of column addressing lines that electrically connect the respective columns of micromirrors;

first and second pluralities of row addressing lines that lie above and below the micromirrors, respectively; and a display controller that a) receives changes in content of the image, b) updates the direct-view image in response to those changes by applying a voltage to a pair of said first and second row addressing lines one row at a time for a period longer than the mirrors' known response time while simultaneously driving the column addressing lines between binary voltages to produce attractive electrostatic forces on said micromirrors in the enabled row that exceed the micromirror's bistable threshold and actuate the micromirrors between their two stable states, the attractive electrostatic forces on the micromirrors in the remaining non-enabled rows being insufficient to overcome the micromirrors' bistable threshold so that the micromirrors remain in their stable state, and c) once the image is updated, removes power from micromirror array.

22. The direct-view display of claim 21, further comprising an array of hinges that each have a pair of edges of unequal length, the longer edge exhibiting a compressive stress when flat such the longer edge wants to snap up or down to relieve the compressive stress thereby causing the hinge to rotate to one of two stable states in response to the attractive electrostatic force and thereby actuate the micromirror to its open or closed state.

23. The direct-view display of claim 21, further comprising first and second stops that contact said micromirror in its open and closed states respectively, the Van der Walls forces that occur when the micromirror contacts said stops creating the micromirrors' bistable response.

24. The direct-view display of claim 21, further comprising first and second arrays of attractor pads that respectively lie above and below the array of micromirrors and are electrically connected into rows by said first and second plurality of row addressing lines.

25. A bistable direct-view display, comprising:
a background;
an array of electrostatically-actuated bistable micromirrors, each said micromirror having a hinge whose edges are of unequal length, the longer edge exhibiting a compressive stress when flat such the longer edge wants to snap up or down to relieve the compressive stress thereby causing the hinge to rotate to one of two stable states and deflect the micromirror between one of two stable states, an open state in which the mirror covers a portion of said background and a closed state in which the mirror uncovers said background;
a plurality of column addressing lines that connect said array of micromirrors into respective columns;
a first plurality of row addressing lines that lie above respective rows of the micromirrors; and
a second plurality of row addressing lines that lie below respective rows of the micromirrors,
said micromirrors responding to potential differences between said micromirror and said first or second row addressing lines that produce electrostatic attractive forces that cause said hinges to snap to one of their two stables states and deflect the micromirrors between their open and closed states a row at a time.

26. The direct-view display of claim 25, wherein said array of micromirrors is mounted on a substrate, each said hinge comprising:

a pair of posts on said substrate;
a compliant strip having the pair of edges of unequal length that are pinned at both ends by said posts above said substrate, said compliant strip's longer edge snapping up and down at its midpoint to relieve the compressive stress and rotate the strip about its shorter edge between the hinge's stable states; and
a support post at the midpoint of said compliant strip that supports said micromirror and translates the rotation of the compliant strip such that the micromirror actuates between its open and closed states.

27. The direct-view display of claim 26, wherein said compliant strip rotates approximately plus and minus 45° with respect to the substrate, said support post being tapered by approximately 45° to translate this rotation such that the micromirror actuates between approximately 0° in its open state and 90° in its closed state.

28. A bistable direct-view display, comprising:
a background;
an array of electrostatically-actuated micromirrors that deflect between two stable states, an open state in which the mirror covers a portion of said background and a closed state in which the mirror uncovers said background;
first and second stops that contact said micromirror in its open and closed states respectively, the Van der Walls forces that occur when the micromirror contacts said stops creating a bistable response;
a plurality of column addressing lines that connect said array of micromirrors into respective columns;
a first plurality of row addressing lines that lie above respective rows of the micromirrors; and
a second plurality of row addressing lines that lie below respective rows of the micromirrors,
said micromirrors responding to potential differences between said micromirror and said first or second row addressing lines that produce electrostatic attractive forces to actuate the micromirrors a row at a time between their open and closed states where they contact said first and second stops, respectively.

29. The direct-view display of claim 28, wherein said first and second stops form a sharp tip at the point of contact with micromirror.

30. The direct-view display of claim 28, wherein one said second stop is centered above a plurality of said micromirrors in their closed state.

* * * * *